US012654555B2

(12) United States Patent
Jones et al.

(10) Patent No.: US 12,654,555 B2
(45) Date of Patent: Jun. 16, 2026

(54) HIGH-VOLTAGE POWER SUPPLIES FOR VEHICLES THAT ELIMINATE LOW-VOLTAGE BATTERIES

(71) Applicant: Karma Automotive LLC, Irvine, CA (US)

(72) Inventors: Jim Jones, Irvine, CA (US); Fazel Farahmand, Aliso Viejo, CA (US); Behnam Foroushani, Irvine, CA (US); Abdul Lateef, Irvine, CA (US); Donya Nojavanzadeh, Irvine, CA (US)

(73) Assignee: Karma Automotive, Inc., Irvine, CA (US)

( * ) Notice: Subject to any disclaimer, the term of this patent is extended or adjusted under 35 U.S.C. 154(b) by 107 days.

(21) Appl. No.: 18/663,575

(22) Filed: May 14, 2024

(65) Prior Publication Data

US 2025/0353376 A1     Nov. 20, 2025

(51) Int. Cl.
*B60L 1/00* (2006.01)
*H01M 10/42* (2006.01)
*H02J 7/00* (2026.01)

(52) U.S. Cl.
CPC ............. *B60L 1/00* (2013.01); *H01M 10/425* (2013.01); *H01M 10/4264* (2013.01); *H02J 7/855* (2026.01); *B60L 2210/10* (2013.01); *H01M 2220/20* (2013.01); *H02J 2207/20* (2020.01)

(58) Field of Classification Search
CPC .... B60L 1/00; B60L 2210/10; H01M 10/425; H01M 10/4264; H01M 2220/20; H02J 7/0063; H02J 2207/20
See application file for complete search history.

(56) References Cited

U.S. PATENT DOCUMENTS

| | | | |
|---|---|---|---|
| 6,984,965 B2 | 1/2006 | Vinciarelli | |
| 10,965,205 B2 | 3/2021 | Ha et al. | |
| 11,791,652 B2 * | 10/2023 | Semenov | H02M 3/1584 |
| | | | 320/166 |
| 2021/0094441 A1 * | 4/2021 | Sampson | B60K 1/02 |
| 2021/0252990 A1 | 8/2021 | Wang | |
| 2022/0115878 A1 * | 4/2022 | Khozikov | B60L 3/0046 |
| 2022/0274488 A1 * | 9/2022 | Spjuth | B60L 58/20 |
| 2023/0261331 A1 * | 8/2023 | Morton | H01M 10/425 |
| | | | 429/163 |
| 2024/0262247 A1 * | 8/2024 | Bandyopadhyay | H02S 40/38 |

FOREIGN PATENT DOCUMENTS

| | | |
|---|---|---|
| KR | 20120062956 A | 6/2012 |
| KR | 102022705 B1 | 9/2019 |
| WO | 2022129538 A1 | 6/2022 |

OTHER PUBLICATIONS

International Search Report and Written Opinion relating to Application PCT/US2025/029149, dated Aug. 26, 2025.

* cited by examiner

*Primary Examiner* — Michael C Zarroli
(74) *Attorney, Agent, or Firm* — Honigman LLP; Thomas J. Appledorn; Grant Griffith

(57) ABSTRACT

A vehicle includes an electric motor, one or more low-voltage components, a high-voltage battery pack, and a direct current to direct current (DC-to-DC) converter. The high-voltage battery pack includes one or more high-voltage battery strings configured to provide a high-voltage output on a high-voltage bus for powering the electric motor. The DC-to-DC converter is connected to the one or more high-voltage battery strings, and is configured to generate a low-voltage output on a low-voltage bus for powering the one or more low-voltage components.

18 Claims, 10 Drawing Sheets

HIGH-VOLTAGE POWER SUPPLIES FOR VEHICLES THAT ELIMINATE LOW-VOLTAGE BATTERIES

TECHNICAL FIELD

This disclosure relates to high-voltage power supplies for vehicles that eliminate low-voltage batteries.

BACKGROUND

A low-voltage battery is an essential component of a conventional vehicle. The low-voltage battery has traditionally been used to supply power to critical loads (e.g., for steering or braking), to start a vehicle, and to provide a redundant source of power for sudden or peak load demands. On newer vehicles, the low-voltage battery also supplies power to loads that are enabled even when the vehicle is turned off, also known as key-off loads.

SUMMARY

One aspect of the disclosure provides a vehicle that includes an electric motor, one or more low-voltage components, a high-voltage battery pack, and a direct current to direct current (DC-to-DC) converter. The high-voltage battery pack includes one or more high-voltage battery strings configured to provide a high-voltage output on a high-voltage bus for powering the electric motor. The DC-to-DC converter is connected to the one or more high-voltage battery strings, and configured to generate a low-voltage output on a low-voltage bus for powering the one or more low-voltage components.

Implementations of the disclosure may include one or more of the following optional features. In some implementations, the high-voltage battery pack also includes a low-voltage output terminal connected to the low-voltage bus and the DC-to-DC converter, which is configured to generate the low-voltage output at the low-voltage output terminal. In some examples, the high-voltage battery pack also includes: one or more main contactors, each main contactor of the one or more main contactors selectively connecting a corresponding high-voltage battery string to a high-voltage output terminal; a high-voltage contactor selectively connecting the DC-to-DC converter to the one or more battery strings; and a low-voltage contactor selectively connecting the DC-to-DC converter to the low-voltage output terminal. The first low-voltage contactor may be closed to connect the DC-to-DC converter to the one or more battery strings for generating the low-voltage output while at least one of the one or more main contactors are open.

In some examples, the DC-to-DC converter includes a master DC-to-DC converter, and the vehicle also includes a redundant slave DC-to-DC converter, the redundant slave DC-to-DC converter connected to the high-voltage battery strings and configured to alternatively generate the low-voltage output. In some implementations, the vehicle also includes a controller in communication with the master DC-to-DC converter and the redundant slave DC-to-DC converter. The controller is configured to perform operations including monitoring the master DC-to-DC converter, determining that a failure associated with the master DC-to-DC converter has occurred. The operations include, based on determining that a failure associated with the master DC-to-DC converter has occurred, activating the redundant slave DC-to-DC converter and de-activating the master DC-to-DC converter. In some examples, the high-voltage battery pack includes the master DC-to-DC converter. In some implementations, the high-voltage battery pack also includes the redundant slave DC-to-DC converter.

In some implementations, the power supply also includes: a first low-voltage contactor selectively connecting the master DC-to-DC converter to the one or more battery strings; a second low-voltage contactor selectively connecting the master DC-to-DC converter to the low-voltage bus; a third low-voltage contactor selectively connecting the redundant slave DC-to-DC converter to the one or more battery strings; and a fourth low-voltage contactor selectively connecting the redundant slave DC-to-DC converter to the low-voltage bus. In some examples, the power supply also includes a second redundant slave DC-to-DC converter, the second redundant slave DC-to-DC converter connected to the one or more battery strings and configured to alternatively generate the low-voltage output. The one or more low-voltage components may include one or more of a critical load, a non-critical load, or a key-off load. In some implementations, the vehicle also includes a supercapacitor configured to store and provide power for an overload or peak load condition. In some implementations, the vehicle does not include a low-voltage battery for powering the one or more low-voltage components.

Another aspect of the disclosure provides a system including data processing hardware and memory hardware in communication with the data processing hardware. The memory hardware stores instructions that when executed on the data processing hardware cause the date processing hardware to perform operations including detecting a key-on condition and, based on detecting the key-on condition, activating a direct current to direct current (DC-to-DC) converter of a high-voltage battery pack to generate a low-voltage output on a low-voltage bus for powering one or more low-voltage components of the vehicle.

Implementations of the disclosure may include one or more of the following optional features. In some implementations, the operations also include detecting a driving mode and, based on detecting the driving mode, closing one or more main contactors to generate a high-voltage output on a high-voltage bus for powering an electric motor of the vehicle, each main contactor associated with a corresponding battery string of the high-voltage battery pack. In some examples, the operations also include detecting a key-off condition and, based on detecting the key-off condition, opening the one or more main contactors while leaving the DC-to-DC converter active to power all key-off loads. In some implementations, the operations also include detecting a high-voltage safety condition and, based on detecting the high-voltage safety condition, opening the one or more main contactors while leaving the DC-to-DC converter active. The high-voltage safety condition may be associated with a crash or vehicle service notification.

Activating the DC-to-DC converter may include closing a main contactor associated with a high-voltage battery string to generate a high voltage, closing a first low-voltage contactor to connect the DC-to-DC converter to the generated high voltage, and closing a second low-voltage contactor to connect the DC-to-DC converter to the low-voltage bus. In some examples, the operations also include detecting an overload or additional load condition and, based on detecting the overload or additional load condition, activating a second DC-to-DC converter to generate a second low-voltage output on a second low-voltage bus for powering one or more low-voltage components of the vehicle.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A low-voltage battery is an essential component of a conventional vehicle. The low-voltage battery has traditionally been used to supply power to critical loads (e.g., for steering or braking), to start a vehicle, and to provide a redundant source of power for sudden or peak load demands. On newer vehicles, the low-voltage battery also supplies power to loads that are enabled even when the vehicle is turned off, also known as key-off loads. However, failure of such low-voltage batteries is a common issue that all vehicles experience, sometimes even after just a few years of service. Due to, for example, continuous charging and discharging cycles. Moreover, low-voltage batteries represent a limited energy capacity. Accordingly, there is a need to eliminate low-voltage batteries from vehicles to ensure the reliability of the vehicles.

Disclosed implementations include a vehicle having a high-voltage power supply that includes one or more high-voltage battery strings and one or more direct current to direct current (DC-to-DC) converters. The DC-to-DC converter(s) are connected to the high-voltage battery string(s) and configured to generate, from a high-voltage output by the battery string(s), a low-voltage output on a low-voltage bus for powering one or more low-voltage components. Notably, because the battery string(s) may be configured to provide redundancy and the DC-to-DC converter(s) are connected to the high-voltage battery string(s), the traditional low-voltage battery may be eliminated.

Figure 1:
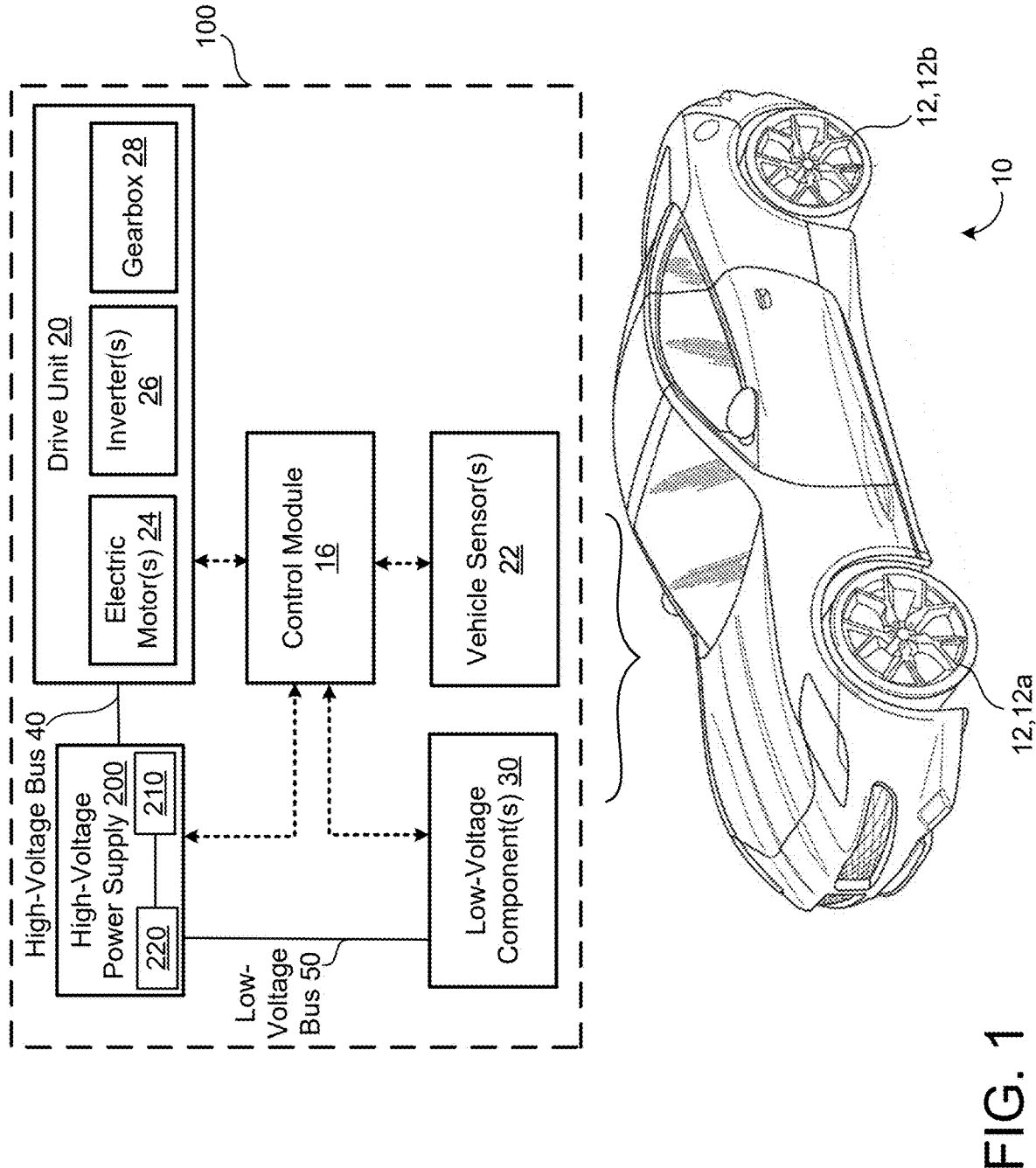
FIG. 1 is a schematic view of an example vehicle including a high-voltage power supply that eliminates a low-voltage battery.

Referring to FIG. 1, a vehicle 10, such as a battery-powered electric vehicle, a hybrid vehicle, a plug-in hybrid electric vehicle, and/or an internal combustion engine vehicle includes a power train 100. In some implementations, the power train 100 includes a vehicle control module 16 (also referred to herein as controller 16), a drive unit 20, one or more vehicle sensors 22 implemented on the vehicle 10, and one or more low-voltage components 30 implemented on the vehicle 10. In some configurations, the vehicle 10 is a battery-powered electric vehicle, a hybrid electric vehicle, or a plug-in hybrid electric vehicle such that the drive unit 20 includes one or more electric motors 24, one or more inverters 26, and one or more gearboxes 28. In other configurations, the vehicle 10 is an internal combustion engine vehicle such that the drive unit 20 includes the gearbox(es) 28 and an engine (not shown). The vehicle 10 may also include one or more wheels 12, 12a-n implemented on the vehicle 10. The vehicle 10 may be any type of vehicle, such as a sedan, a truck, a boat, a motorcycle, or an aircraft. The low-voltage components 30 may include any number, type(s), or combinations of low-voltage components including, but not limited to, key-off loads, critical loads, non-critical loads, accessory loads, or auxiliary loads.

The controller 16 is configured to control operation of the vehicle 10 and may include data processing hardware 410 (FIG. 4) and memory hardware 420 (FIG. 4) in communication with the data processing hardware 410 and storing instructions that, when executed on the data processing hardware 410, cause the data processing hardware 410 to perform operations. In particular, the controller 16 may send control signals to the inverter(s) 26 to control operation of one or more electric motors 24 implemented on the vehicle 10 based on sensor data received from the one or more vehicle sensors 22. The controller 16 may also control or interact with the low-voltage component(s) 30.

A high-voltage power supply 200 (also referred to herein as power supply 200) implemented on the vehicle 10 supplies high-voltage electric power on a high-voltage bus 40 for operating the inverter(s) 26, which are electrically coupled between the power supply 200 and the electric motor(s) 24. The power supply 200 also supplies low-voltage electric power on a low-voltage bus 50 for operating the low-voltage component(s) 30. The power supply 200 includes one or more parallel high-voltage battery strings 210, 210a-n (also referred to herein as battery strings 210) and one or more DC-to-DC converters 220, 220a-n. The power supply 200 does not need to include the same number of battery strings 210 as DC-to-DC converters 220. The DC-to-DC converter(s) 220 are connected to the high-voltage battery string(s) 210 and are configured to generate, from a high-voltage output by the battery string(s) 210, a low-voltage output on the low-voltage bus 50 for powering the one or more low-voltage components 30.

In some implementations, the controller 16 controls contactors of the power supply 200 to provide redundancy under various conditions and situations to increase the reliability of the power supply 200. That is, the controller 16 may control the power supply 200 to ensure that low-voltage power is reliably provided for critical or key-off loads 30. For clarity of explanation, the following disclosure refers to the controller 16 for performing operations for controlling the power supply 200. However, one or more of the operations for controlling the power supply 200 may be performed by other controllers or electronic control units (ECUs) of the vehicle 10, such as a power management unit (PMU) ECU of the power supply 200, a battery management unit (BMU) ECU of a battery pack, a powertrain control unit (PCU)

ECU, and/or an ECU responsible for the active discharge of the high-voltage bus 40 by, for example, the inverter(s) 26 powering an electric motor(s) 24.

FIGS. 2A-2G are schematic views of various example high-voltage power supplies 200, 200*a-g* configured to provide a high output voltage on the high-voltage bus 40 for driving, for example, the inverter(s) 26, which power the electric motor(s) 24. The power supplies 200 are also configured to provide a low output voltage on the low-voltage bus 50 for driving, for example, the low-voltage component(s) 30. Notably, none of the example power supplies 200 includes or requires a low-voltage battery for powering the low-voltage component(s) 30. That is, the power supplies 200 obviate the conventional need or requirement for the vehicle 10 to include a low-voltage battery.

The power supplies 200 include the one or more battery strings 210 configured to provide the high-voltage output on the high-voltage bus 40. The power supplies 200 also include the one or more DC-to-DC converters 220. The one or more DC-to-DC converters 220 are connected to the one or more high-voltage battery strings 210, and are configured to generate, from a high-voltage output by the battery string(s) 210, the low-voltage output on the low-voltage bus 50 for powering the one or more low-voltage components 30. The power supplies 200 also include one or more positive main contactors 211, 211*a-n*. Each positive main contactor 211 of the one or more positive main contactors 211 selectively connects (e.g., under control of the controller 16 via control inputs that are not shown for clarity of illustration) a corresponding battery string 210 to a high-voltage output terminal 232.

While not shown for clarity of illustration, the power supplies 200 may include one or more negative main contactors for selectively connecting (e.g., under control of the controller 16 via control inputs that are not shown for clarity of illustration) the one or more battery strings 210 to a negative output terminal of the power supply 200. In some implementations, a single negative main contactor selectively connects (e.g., under control of the controller 16 via control inputs that are not shown for clarity of illustration) all the battery strings 210 to the negative output terminal. In other implementations, each negative main contactor selectively connects (e.g., under control of the controller 16 via control inputs that are not shown for clarity of illustration) a corresponding battery string 210 to the negative output terminal.

The power supplies 200 may also include a jump start interface or port (not shown for clarity of illustration) that is connected to the low-voltage bus 50 for receiving power from an external source to, for example, jump start the vehicle 10. While also not shown for clarity of illustration, the power supplies 200 may also include a low-voltage supercapacitor connected to the low-voltage bus 50 to store and provide power to assist with peak or overload conditions, for example. The supercapacitor may also be used, in some implementations, to start or drive a vehicle 10 when the battery strings 210 are depleted. The supercapacitor may also be used, in some examples, to reduce electromagnetic emissions of a power supply 200.

The example power supplies 200 provide a number of advantages including that the one or more battery strings 210 and the one or more DC-to-DC converter(s) 220 be partitioned in various arrangements to provide failsafe: powering of key-off loads 30; active load management; mapping of DC-to-DC converters 220 to critical and non-critical loads 30; re-allocation of power to critical loads 30 during over-current load conditions; switching inverters 26 on and off based on driving situations for performance or range; de-electrification of interconnects during charging or vehicle-off conditions; soft switching between multiple DC-to-DC converters 220 in support of delayed accessory modes; uninterrupted supply of power to a critical DC-to-DC converter 220 as long as at least one battery string 210 is in a healthy condition and regardless of the switching state of positive main contactors 211; jumpstart means when the DC-to-DC converter 220 that supplies key-off loads 30 has failed; or an ability to supply key-off loads 30 using another DC-to-DC converter 220 during vehicle operation if the key-off load's allocated DC-to-DC converter 220 has failed.

Figure 2A:
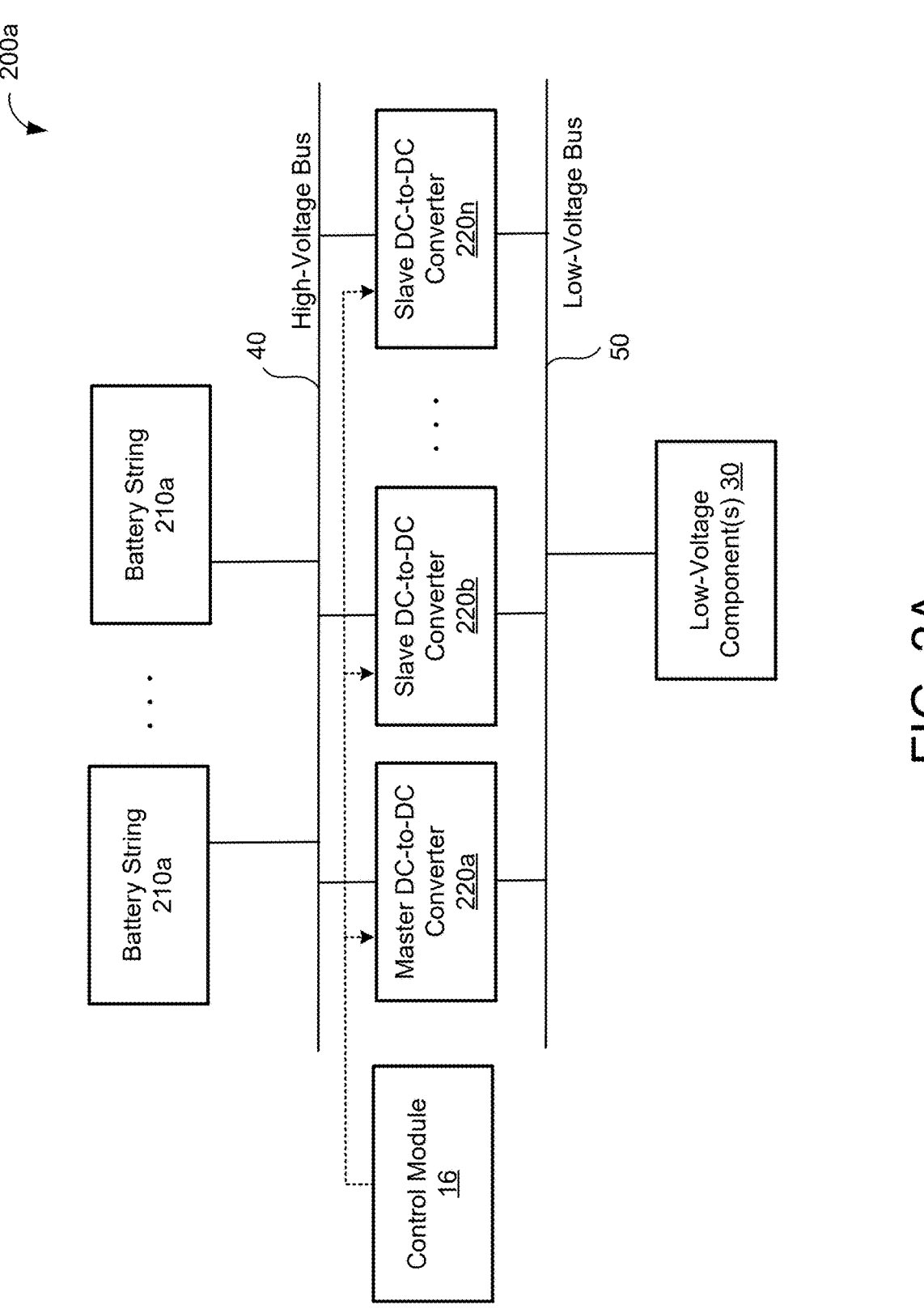
FIG. 2A is a schematic view of an example high-voltage power supply that eliminates a low-voltage battery.

Referring to FIG. 2A, an example high-voltage power supply 200*a* includes the one or more battery strings 210 configured to provide the high-voltage output on the high-voltage bus 40. The power supply 200*a* also includes the one or more DC-to-DC converters 220. The one or more DC-to-DC converters 220 are connected to the one or more high-voltage battery strings 210, and are configured to generate, from a high-voltage output by the battery string(s) 210, the low-voltage output on the low-voltage bus 50 for powering the one or more low-voltage components 30. In the example shown, the one or more DC-to-DC converters 220 are arranged as a master DC-to-DC converter 220*a* with one or more redundant slave DC-to-DC converters 220*b-n*. Here, the slave DC-to-DC converter(s) 220 are connected to the high-voltage battery strings 210 and configured to alternatively generate the low-voltage output on the low-voltage bus 50. In some implementations, the controller 16 monitors the master DC-to-DC converter 220*a* for a failure and, based on, or in response to, determining that a failure associated with the master DC-to-DC converter 220*a* has occurred, activates a slave DC-to-DC converter 220 and de-activates the master DC-to-DC converter 220*a*. In other examples, only one DC-to-DC converter 220*a* is implemented.

Figure 2B:
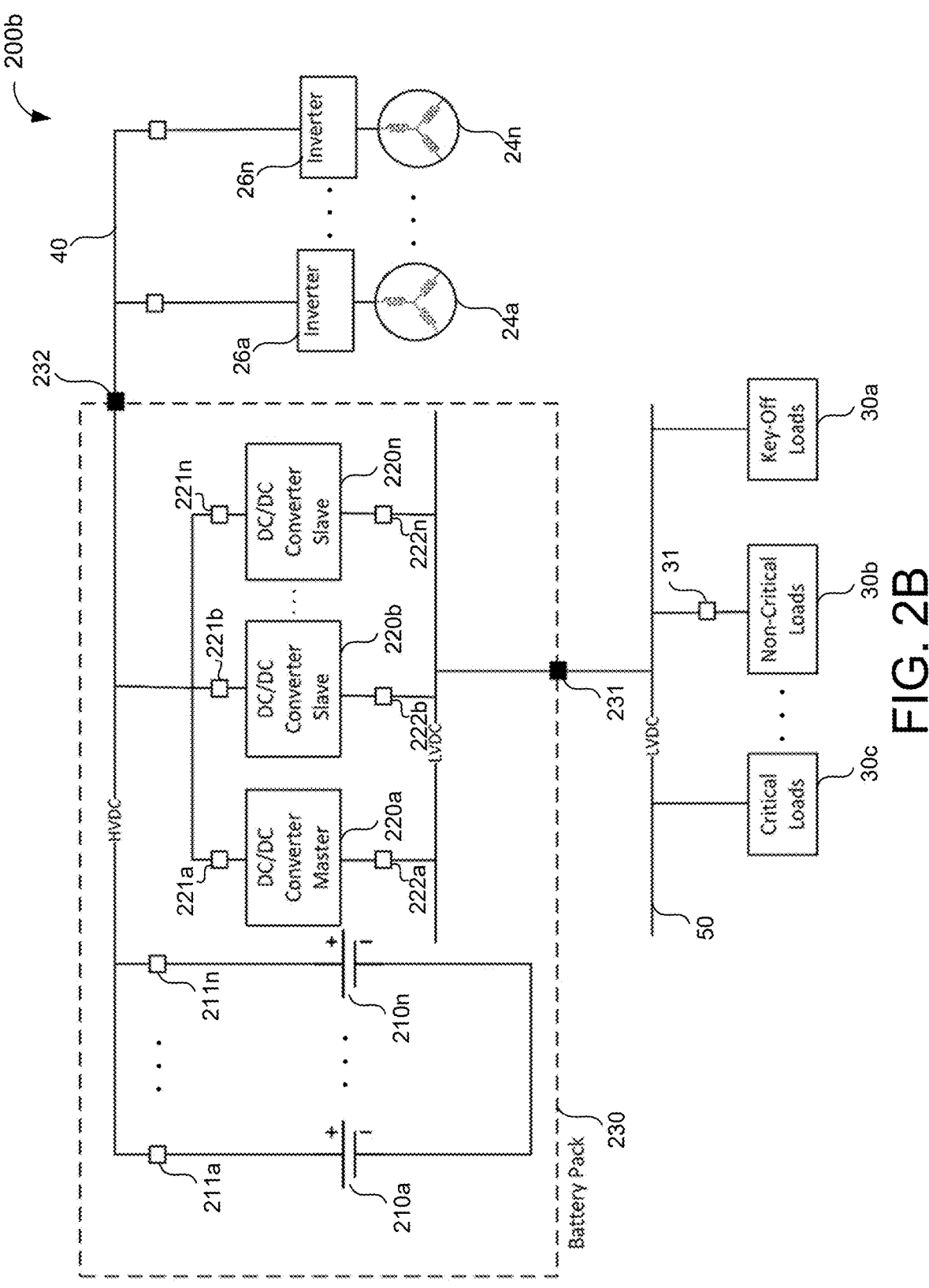
FIG. 2B is a schematic view of another example high-voltage power supply that eliminates a low-voltage battery.

Referring to FIG. 2B, an example high-voltage power supply 200*b* implements the one or more battery strings 210 and the one or more DC-to-DC converters 220 together in a high-voltage multi-string battery pack 230 (also referred to herein as battery pack 230). Here, the battery pack 230 includes a low-voltage output terminal 231 connected to the low-voltage bus 50, and a high-voltage output terminal 232 connected to the high-voltage bus 40. The one or more DC-to-DC converters 220 are configured to generate the low-voltage output at the low-voltage output terminal 231. The one or more battery strings 210 are configured to generate the high-voltage output at the high-voltage output terminal 232.

Figure 2C:
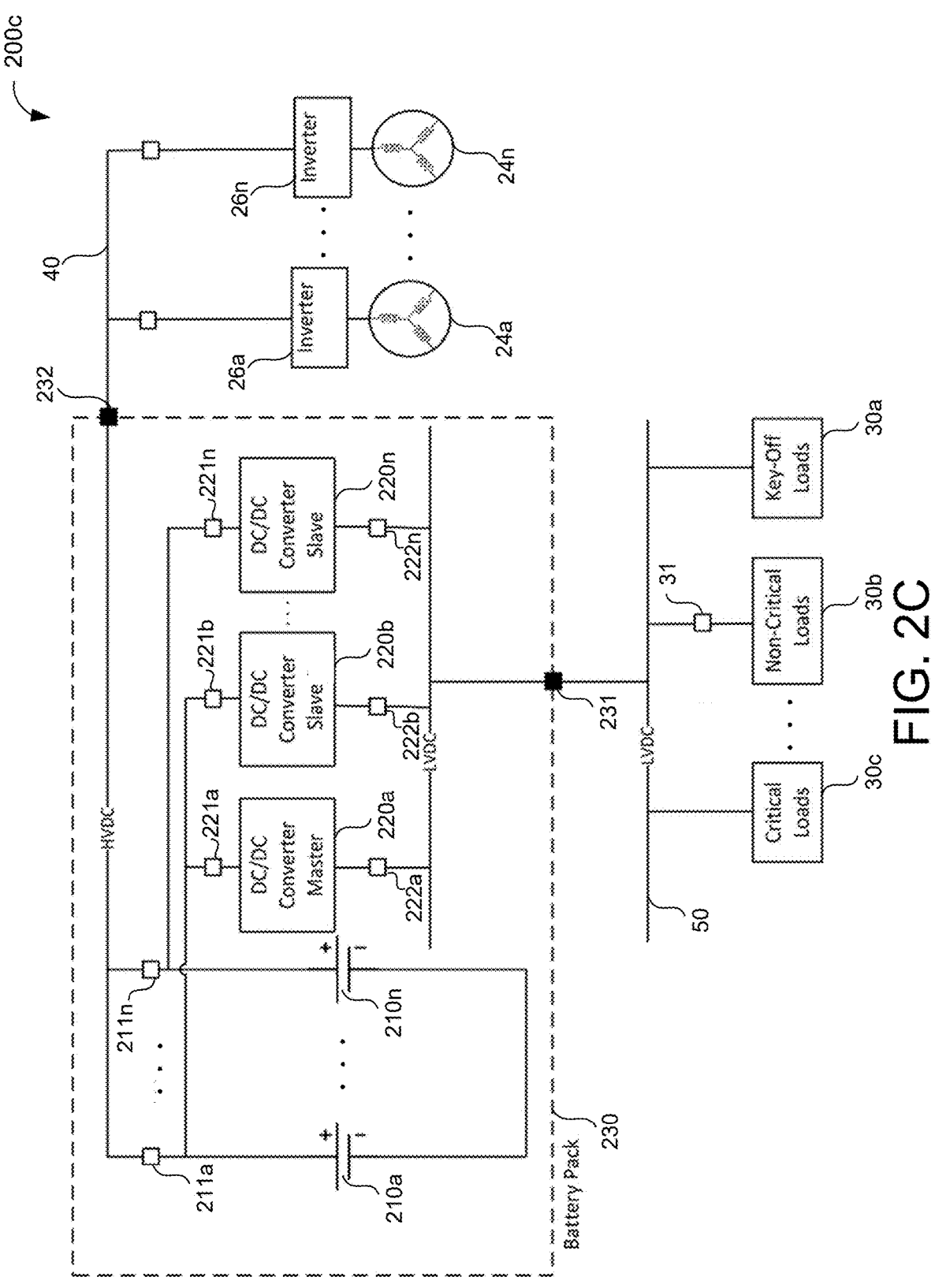
FIG. 2C is a schematic view of yet another example high-voltage power supply that eliminates a low-voltage battery.

Referring to FIG. 2C, in an example high-voltage power supply 200*c*, the high-voltage contactors 221 are directly connected to a battery string 210 rather than to the high-voltage bus 40, as compared to the power supply 200*b* of FIG. 2B. In this way, a DC-to-DC converter 220 may be active without the high-voltage bus 40 having to be electrified. Notably, this arrangement enables the one or more DC-to-DC converters 220 to provide power to key-off loads and/or critical loads without high-voltage cable interconnections being electrified (e.g., in an emergency state or during vehicle service).

Figure 2D:
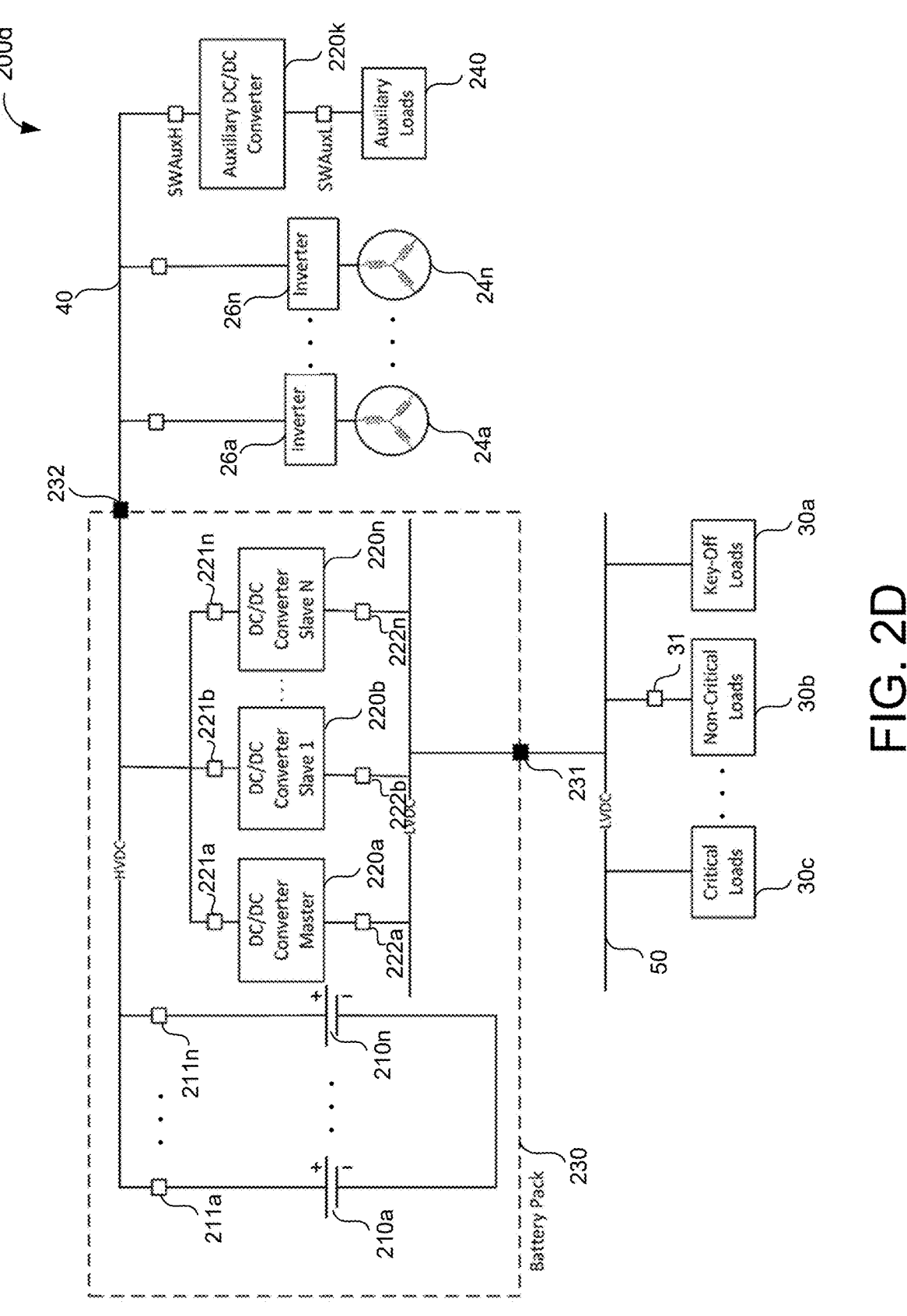
FIG. 2D is a schematic view of still another example high-voltage power supply that eliminates a low-voltage battery.

Referring to FIG. 2D, an example high-voltage power supply 200*d*, as compared to the power supply 200*b* of FIG. 2B, includes an auxiliary DC-to-DC converter 220*k* that is external to the battery pack 230 and implements another DC-to-DC converter 220 for providing power to one or more auxiliary loads 240. Here, the auxiliary loads 240 may include a load that is implemented separately from the vehicle 10 and is connected to the vehicle 10 by a user for power and/or communication with the vehicle 10. For example, the auxiliary load 240 may be a smart or mobile user device.

Figure 2E:
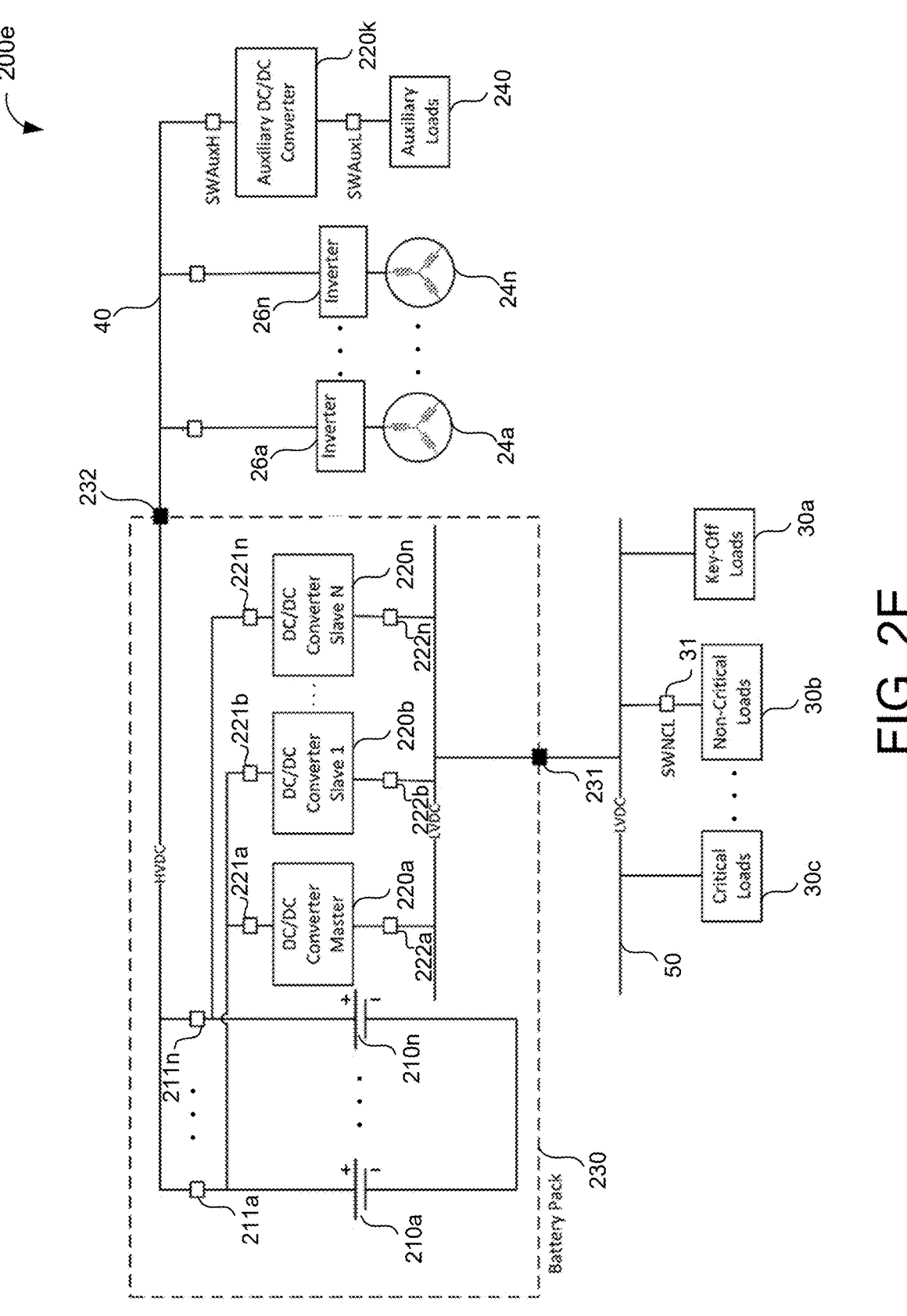
FIG. 2E is a schematic view of a further example of a high-voltage power supply that eliminates a low-voltage battery.

Referring to FIG. 2E, in an example high-voltage power supply 200e, the high-voltage contactors 221 are directly connected to the battery strings 210 rather than to the high-voltage bus 40, as compared to the power supply 200d of FIG. 2D. In this way, a DC-to-DC converter 220 may be active without the high-voltage bus 40 having to be electrified. Notably, this arrangement enables the one or more DC-to-DC converters 220 to provide power to key-off loads and/or critical loads without high-voltage cable interconnections being electrified (e.g., in an emergency state or during vehicle service).

Figure 2F:
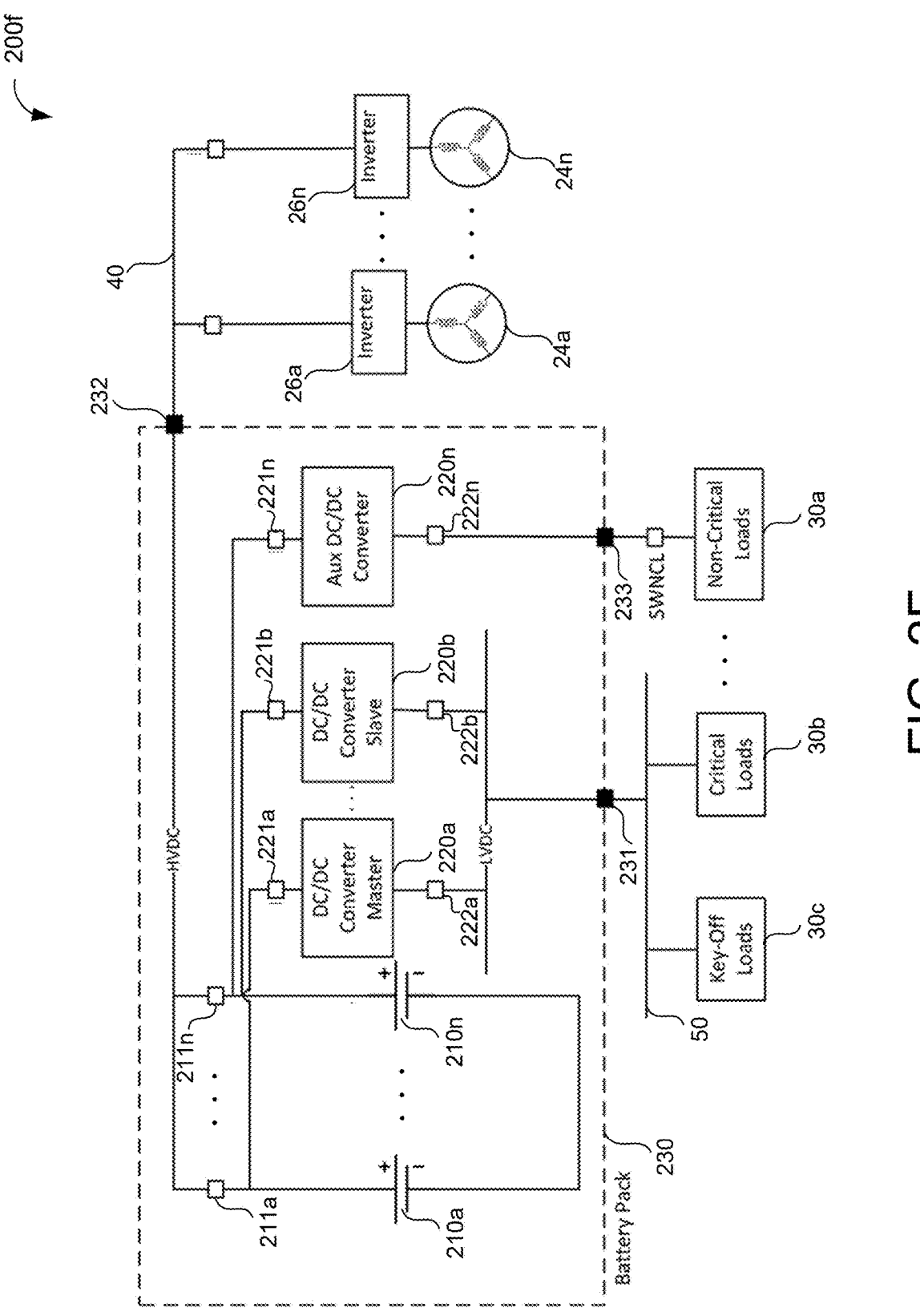
FIG. 2F is a schematic view of an even further example of a high-voltage power supply that eliminates a low-voltage battery.

Referring to FIG. 2F, an example high-voltage power supply 200f, as compared to the power supply 200e of FIG. 2E, includes the additional auxiliary DC-to-DC converter 220k that is integrated in the battery pack 230 and implements one or more additional DC-to-DC converters 220 (e.g., the master DC-to-DC converter 220a with one or more redundant slave DC-to-DC converters 220b-n) for providing power to the one or more auxiliary loads 240.

Figure 2G:
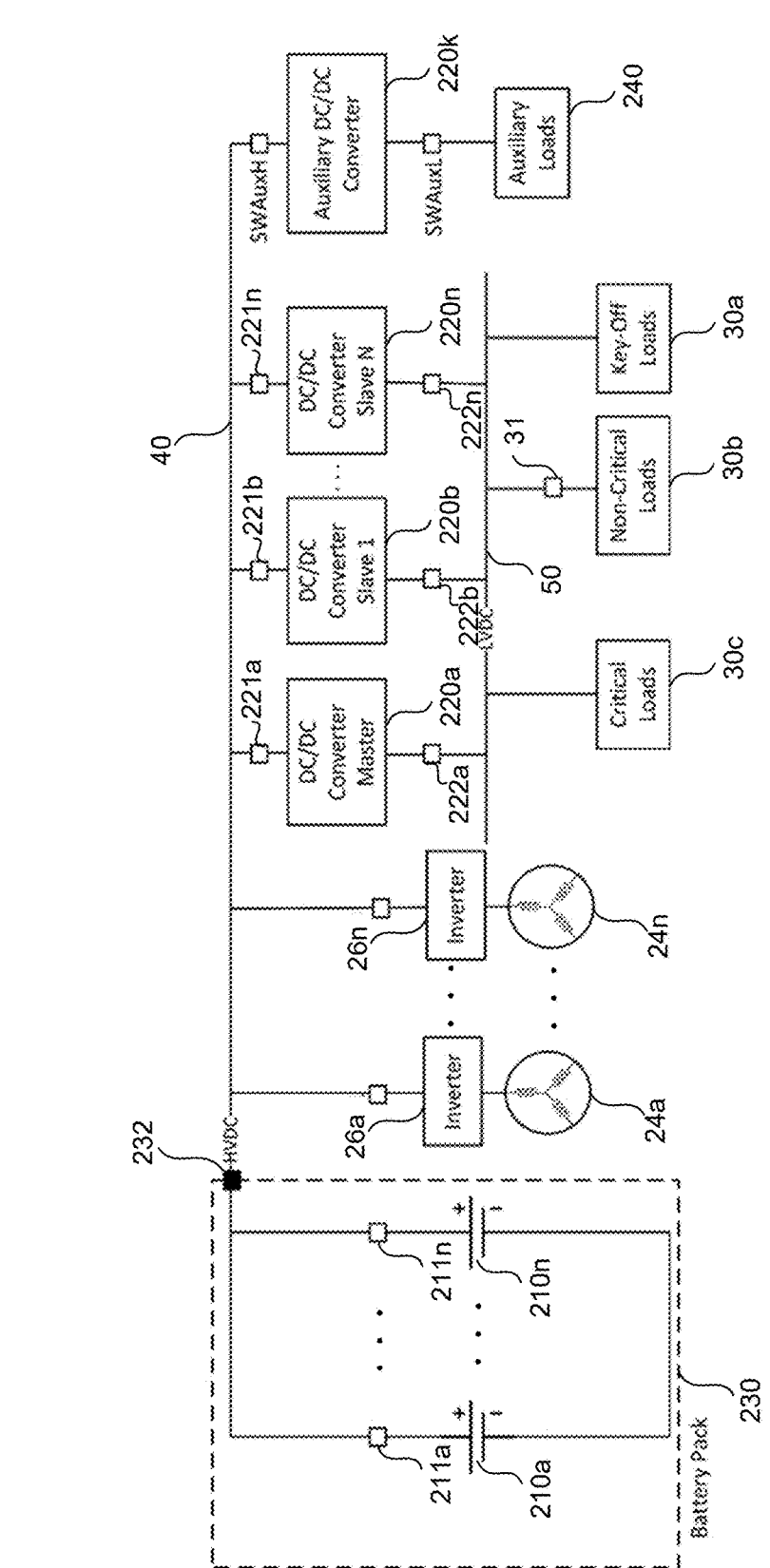
FIG. 2G is a schematic view of a still further example of a high-voltage power supply that eliminates a low-voltage battery.

Referring to FIG. 2G, an example high-voltage power supply 200g implements the one or more DC-to-DC converters 220, 220a-n separately from a high-voltage multistring battery pack 230 that implements the one or more battery strings 210 and the positive main contactors 211, as compared to the power supply 200d of FIG. 2D. The power supply 200g may also include the auxiliary DC-to-DC converter 220k for providing power to the auxiliary load(s) 240.

Figure 3:
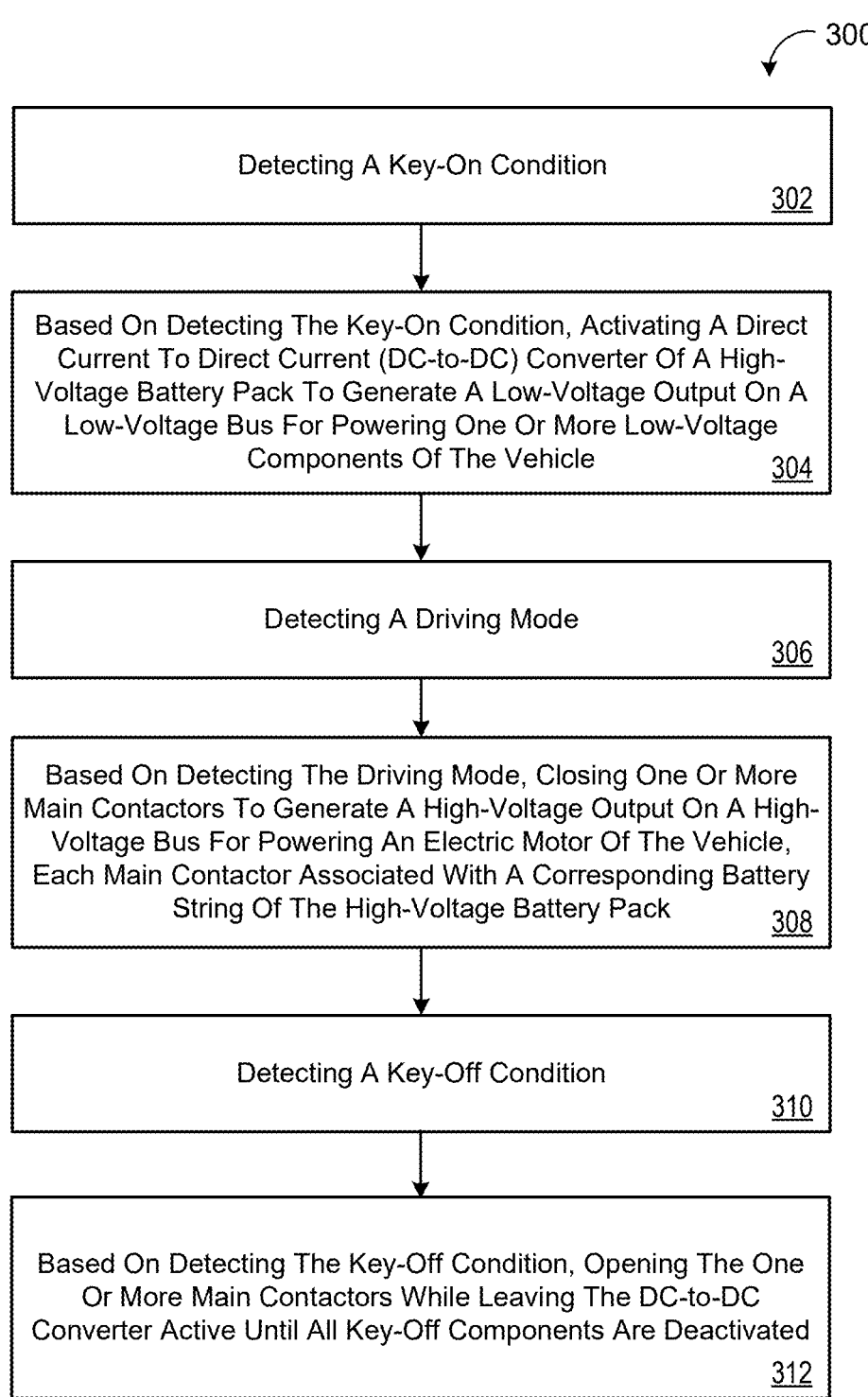
FIG. 3 is a flowchart of an example arrangement of operations for a method of controlling disclosed high-voltage power supplies.

FIG. 3 is a flowchart of an example arrangement of operations for a method 300 of controlling the power supplies 200. Data processing hardware 410 (FIG. 4) may execute instructions stored on memory hardware 420 (FIG. 4) that cause the data processing hardware 410 to perform the operations of the method 300. The data processing hardware 410 and the memory hardware 420 may reside on the controller 16, a PCU ECU, an ECU responsible for the active discharge of a high-voltage bus, or any other ECU or control module of a vehicle 10.

At operation 302, the method 300 includes detecting a key-on condition. For example, a user of the vehicle 10 turns a key or presses a start button to start or turn on the vehicle. At operation 304, the method 300 includes, based on, or in response to, detecting the key-on condition, activating a DC-to-DC converter 220 of a high-voltage battery pack 230 to generate a low-voltage output on a low-voltage bus 50 for powering one or more low-voltage components 30 of a vehicle 10. Here, activating the DC-to-DC converter 220 may include closing a positive main contactor 211 associated with a high-voltage battery string 210 to generate a high voltage, closing a first contactor 221 to connect the DC-to-DC converter 220 to the generated high voltage, and closing a second contactor 222 to connect the DC-to-DC converter 220 to the low-voltage bus 50.

At operation 306, the method 300 includes detecting a driving mode. For example, a user of the vehicle 10 putting the vehicle 10 in gear. At operation 308, the method includes, based on, or in response to, detecting the driving mode, closing one or more positive main contactors 211 to generate a high-voltage output on a high-voltage bus 40 for powering an electric motor (24) of the vehicle 10, each positive main contactor 211 associated with a corresponding battery string 210 of the high-voltage battery pack 230.

At operation 310, the method 300 includes detecting a key-off condition. For example, a user of the vehicle 10 turns a key or presses a stop button to stop or turn off the vehicle. At operation 312, the method 300 includes, based on or in response to, based on detecting the key-off condition, opening the one or more positive main contactors 211 while leaving the DC-to-DC converter 220 active to power all key-off loads 30.

The method 300 may also include detecting a high-voltage safety condition and, based on, or in response to, detecting the high-voltage safety condition, opening one or more positive main contactors 211 while leaving the DC-to-DC converter active 220. Here, the high-voltage safety condition may be associated with a crash or vehicle service notification, for example. The method 300 may further include detecting an overload or additional load condition and, based on, or in response to, detecting the overload or additional load condition, activating a second DC-to-DC converter to generate a second low-voltage output on a second low-voltage bus for powering one or more low-voltage components of the vehicle.

Figure 4:
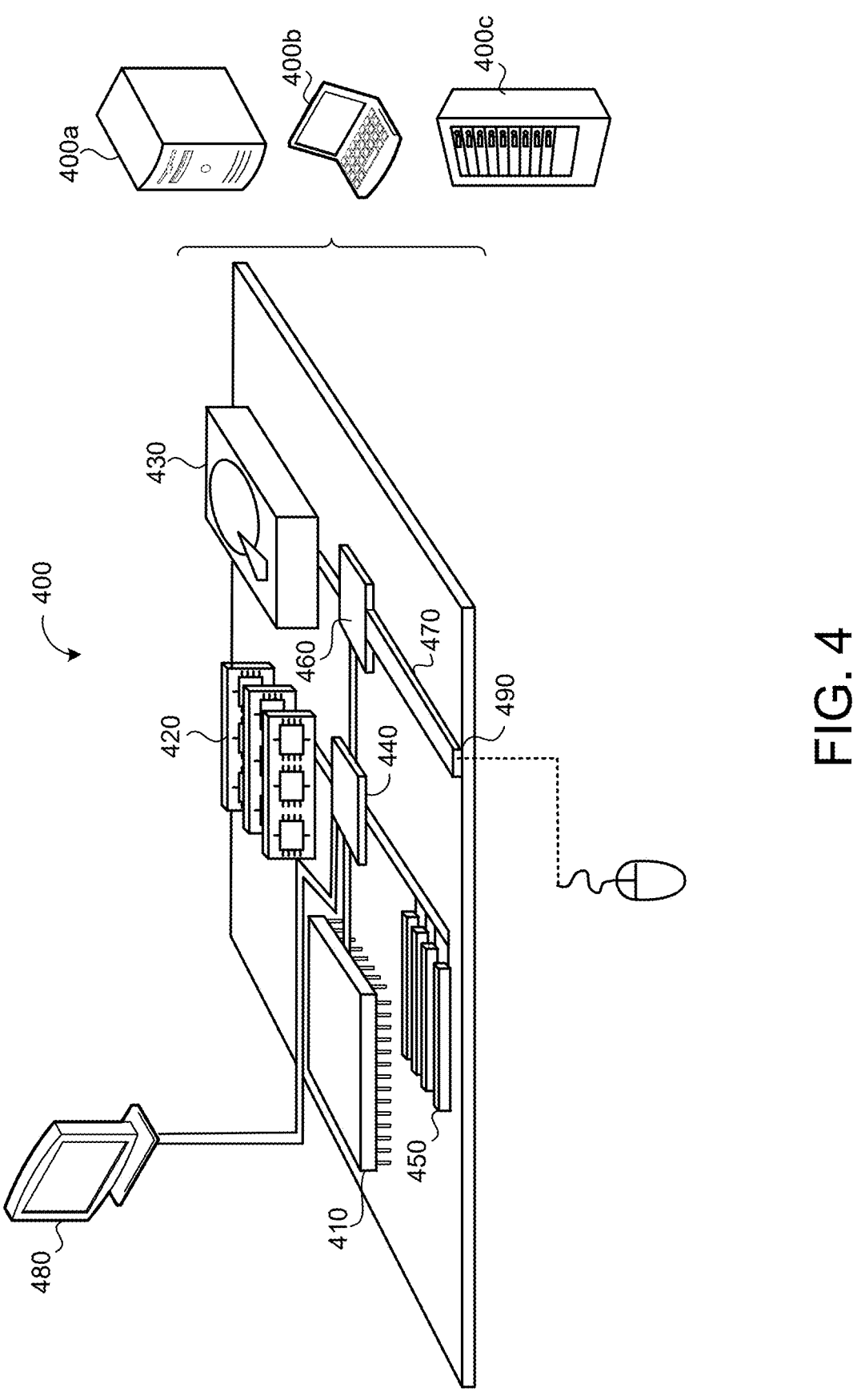
FIG. 4 is a schematic view of an example computing device that may be used to implement the systems and methods described herein.

FIG. 4 is a schematic view of an example computing device 400 that may be used to implement the systems and methods described in this document. The computing device 400 is intended to represent various forms of computing devices, such as control modules, controllers, ECUs, and other appropriate computing devices 400 for use in implementing or controlling a vehicle. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A vehicle comprising:
an electric motor;
one or more low-voltage components; and
a power supply comprising:
    a high-voltage battery pack comprising one or more high-voltage battery strings configured to provide a high-voltage output on a high-voltage bus for powering the electric motor; and
    a direct current to direct current (DC-to-DC) converter comprising a master DC-to-DC converter, the master DC-to-DC converter connected to the one or more high-voltage battery strings, the DC-to-DC converter configured to generate a low-voltage output on a low-voltage bus for powering the one or more low-voltage components; and
    a redundant slave DC-to-DC converter, the redundant slave DC-to-DC converter connected to the one or more high-voltage battery strings and configured to alternatively generate the low-voltage output.

2. The vehicle of claim 1, wherein the high-voltage battery pack further comprises:
    a low-voltage output terminal connected to the low-voltage bus; and
    the DC-to-DC converter, the DC-to-DC converter configured to generate the low-voltage output at the low-voltage output terminal.

3. The vehicle of claim 2, wherein the high-voltage battery pack further comprises:
    one or more main contactors, each main contactor of the one or more main contactors selectively connecting a corresponding high-voltage battery string to a high-voltage output terminal;
    a high-voltage contactor selectively connecting the DC-to-DC converter to the one or more battery strings; and
    a low-voltage contactor selectively connecting the DC-to-DC converter to the low-voltage output terminal.

4. The vehicle of claim 3, wherein the low-voltage contactor can be closed to connect the DC-to-DC converter to the one or more battery strings for generating the low-voltage output while at least one of the one or more main contactors are open.

5. The vehicle of claim 1, further comprising a controller in communication with the master DC-to-DC converter and the redundant slave DC-to-DC converter, the controller configured to perform operations comprising:
    monitoring the master DC-to-DC converter;
    determining that a failure associated with the master DC-to-DC converter has occurred; and
    based on determining that a failure associated with the master DC-to-DC converter has occurred:
    activating the redundant slave DC-to-DC converter; and
    de-activating the master DC-to-DC converter.

6. The vehicle of claim 1, wherein the high-voltage battery pack further comprises the master DC-to-DC converter.

7. The vehicle of claim 6, wherein the high-voltage battery pack further comprises the redundant slave DC-to-DC converter.

8. The vehicle of claim 1, wherein the power supply further comprises:

a first low-voltage contactor selectively connecting the master DC-to-DC converter to the one or more battery strings;
a second low-voltage contactor selectively connecting the master DC-to-DC converter to the low-voltage bus;
a third low-voltage contactor selectively connecting the redundant slave DC-to-DC converter to the one or more battery strings; and
a fourth low-voltage contactor selectively connecting the redundant slave DC-to-DC converter to the low-voltage bus.

9. The vehicle of claim 1, wherein the power supply further comprises a second redundant slave DC-to-DC converter, the second redundant slave DC-to-DC converter connected to the one or more battery strings and configured to alternatively generate the low-voltage output.

10. The vehicle of claim 1, wherein the one or more low-voltage components comprise one or more of a critical load, a non-critical load, or a key-off load.

11. The vehicle of claim 1, further comprising a supercapacitor configured to store and provide power for an overload or peak load condition.

12. The vehicle of claim 1, wherein the vehicle does not include a low-voltage battery for powering the one or more low-voltage components.

13. A computer-implemented method executed on data processing hardware of a vehicle that causes the data processing hardware to perform operations comprising:
    detecting a key-on condition; and
    based on detecting the key-on condition, activating a direct current to direct current (DC-to-DC) converter of a high-voltage battery pack to generate a low-voltage output on a low-voltage bus for powering one or more low-voltage components of the vehicle;
    detecting an overload or additional load condition; and
    based on detecting the overload or additional load condition, activating a second DC-to-DC converter to generate a second low-voltage output on a second low-voltage bus for powering one or more low-voltage components of the vehicle.

14. The computer-implemented method of claim 13, wherein the operations further comprise:
    detecting a driving mode; and
    based on detecting the driving mode, closing one or more main contactors to generate a high-voltage output on a high-voltage bus for powering an electric motor of the vehicle, each main contactor associated with a corresponding battery string of the high-voltage battery pack.

15. The computer-implemented method of claim 14, wherein the operations further comprise:
    detecting a key-off condition; and
    based on detecting the key-off condition, opening the one or more main contactors while leaving the DC-to-DC converter active to power all key-off loads.

16. The computer-implemented method of claim 14, wherein the operations further comprise:
    detecting a high-voltage safety condition; and
    based on detecting the high-voltage safety condition, opening the one or more main contactors while leaving the DC-to-DC converter active.

17. The computer-implemented method of claim 16, wherein the high-voltage safety condition is associated with a crash or vehicle service notification.

18. The computer-implemented method of claim 13, wherein activating the DC-to-DC converter comprises:

closing a main contactor associated with a high-voltage battery string to generate a high voltage;

closing a first low-voltage contactor to connect the DC-to-DC converter to the generated high voltage; and closing a second low-voltage contactor to connect the DC-to-DC converter to the low-voltage bus.

* * * * *